May 3, 1932.     O. W. BREAR     1,856,408
AUTOMATIC STOP VALVE FOR OIL BURNERS
Filed May 3, 1928
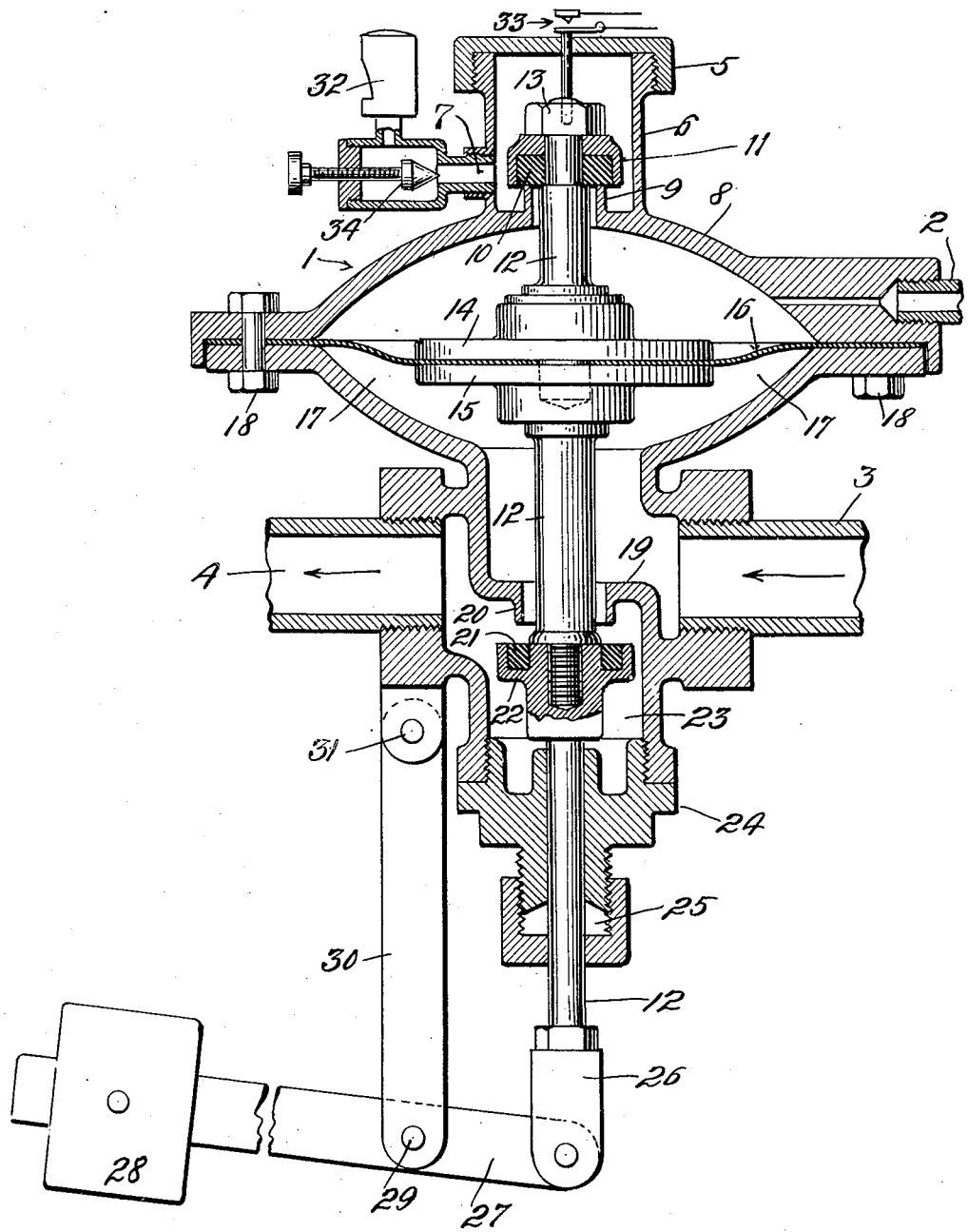
INVENTOR
OWEN W. BREAR
BY
ATTORNEY Patented May 3, 1932

1,856,408

UNITED STATES PATENT OFFICE

OWEN WESLEY BREAR, OF EAST NEWARK, NEW JERSEY, ASSIGNOR TO E. S. HAMMOND, INC., OF NEWARK, NEW JERSEY, A CORPORATION OF NEW JERSEY

AUTOMATIC STOP VALVE FOR OIL BURNERS

Application filed May 3, 1928. Serial No. 274,725.

The object of my invention is to provide a valve which is governed by air or steam under pressure and used for atomizing oil at an oil burner and to shut off the oil supply to this burner entirely and immediately upon this air or steam pressure, hereinafter called air pressure, falling to a predetermined minimum. This object is accomplished by my invention, one embodiment of which is hereinafter more particularly set forth.

For a more detailed description of my invention, reference is to be had to the accompanying drawing which shows a longitudinal section of a valve provided with my improvement.

My improved valve 1 has an air pipe 2 in its upper part which admits air to an upper chamber at the pressure of the air in the system which supplies an ordinary atomizing oil burner of the conventional kind, and 3 indicates an oil inflow pipe which is connected to a lower part of this valve. Oil passes from the pipe 3 into the valve and thence, when it is open, to an outflow pipe 4 which runs to the oil burner which is protected by the valve.

My improved valve 1 has at its top a cap 5 which engages screw threads on a boss 6 which is perforated at 7 with an opening larger than the opening which extends from the pipe 2 for a purpose which will appear below. The boss 6 rises from the air chamber 8 and inside this boss 6 is a second boss 9 which extends upwardly and within the boss 6 and is adapted to be engaged by a relief valve packing of vulcanized fiber, or other suitable material. If steam be used, vulcanized fiber should be used for this packing 10, and if air be used in the system, it may be made of rubber. In any event, the packing should be such that when it rests on the collar 9, a fluid tight joint is formed which will not leak in any manner. This packing 10 is held in a cap 11 which is fixedly mounted at the upper end of a stem 12 and held in place by a suitable nut 13. This stem 12 also is provided with two abutting discs 14 and 15 between which is placed, with a tight joint, a suitable flexible diaphragm 16 which is held between the dome 8 and the oil chamber 17 with a fluid tight joint at all parts by bolts 18 or any other suitable holding means. The oil chamber 17 is connected to the oil inlet pipe 3, as shown. The stem 12, which passes from the top to the bottom of the valve, passes downwardly through the floor 19 of the oil chamber 17 and surrounding this valve and extending downwardly is a collar 20 which is adapted to engage a packing 21 which is preferably Babbitt metal with a fluid tight joint when the valve stem 12 is raised. This packing 21 is held in an annular groove of a flange 22 which forms an integral part of the rod 12 and this flange 22 is located in a lower oil chamber 23 of the valve 1. This lower oil chamber 23 is open to the outflow pipe 4, as shown. The lower end of this chamber 23 is closed by a perforated screw plug 24 at the bottom of which is a stuffing box 25, of the conventional kind, and through the parts 24 and 25 extends the lower end of the rod 12. This rod 12 is not made of one piece throughout, but is preferably made with interengaging screw threaded parts, as indicated, so that the valve may be readily assembled or disassembled, as desired.

The lower end of the rod 12 carries a clevis 26 to which a lever 27 is fulcrumed and this lever 27 is provided with a weight 28 which is made in any suitable way and given sufficient size and mass to be effective at all times, as will appear below. This lever 27 is fulcrumed at 29 in the link 30 which, at its upper end, is pivotally connected at 31 to the closing of the lower chamber 23 or in any other suitable manner.

In the preferred embodiment of my invention, I provide an alarm means 32 or 33 which is connected to the boss 6. The alarm means 32 may be an ordinary air or steam whistle and subject to control through a vent valve 34, as indicated. The alarm means 33 may be an electric alarm connected to the stem 12 and passing through the cap 5. Either or both of these alarms may be employed, as desired.

In view of the foregoing, the operation of my improved valve will be readily understood. Assume that the valve is closed so that no oil can flow through the same, and the operator wishes to open the valve. His first duty is to close the valve 34 so that air will no longer leak out through the pipe 7. It will leak out through the pipe 7 as long as this valve 34 is open because the inlet of the pipe 2 is smaller than the outlet through the pipe 7. Once the valve 34 is closed, the air inside the pipe 7 and the parts connected therewith cannot escape so that pressure is built up on the diaphragm 16 and this pressure continues to be built up until the diaphragm is flexed and the valve closed between the parts 9 and 10. As long as this condition continues, the air pressure which is much higher than the oil pressure, is sufficient to overcome both the oil pressure and the lifting effect of the weight 28 so that the valve remains open between the parts 20 and 21 and then oil flows freely through the valve 1 entering at the inlet pipe 3 and leaving at the outlet pipe 4 with an uninterrupted flow. Whenever the atomizing fluid is shut off, whether it be air or steam or any other fluid, the pressure in the air chamber 8 at once falls and then the pressure of the oil is sufficient to flex the diaphragm 16 in the opposite manner from the manner shown, that is flex it upwardly instead of downwardly and then the packing 10 rises from the collar 9 and makes a free and open vent for the air chamber so that its pressure is immediately made atmospheric and as the outlet at 7 is larger than the inlet at 2, this condition must continue until the valve 34 is closed by hand so as to cooperate with the action of air in flexing the diaphragm 16 to the position shown. As soon as the valve stem 12 rises, as above described, the packing 21 engages the collar 20 so as to close the lower valve at this point and thereby prevent any oil from flowing through the valve. If the oil be under substantial pressure, its pressure alone will be sufficient to press against the under side of the diaphragm 16 and flex the same to the opposite position from that shown and thereby close the valve at 20—21 and open the valve at 9—10, but if the oil be going at an insufficient pressure for this, the weight alone at 28 is sufficient to do this so that in any event, the oil flow through the pipe 4 is shut off whenever the air pressure in the pipe 2 falls below a predetermined amount, depending on the oil pressure and the position of the weight 28 on the lever 27. If the direction of the flow of oil be reversed so that the inflow is in the pipe 4, and the outflow is in the pipe 3, it is unnecessary to use the weight 28 and the connected parts because the oil pressure on the valve 20—21 will close this valve as soon as it is raised a little by the flexing of the diaphragm 16 in the manner described above.

It is most important that this oil flow be entirely shut off because the combustion chamber, after a little use, becomes intensely hot and remains hot as long as the burner is functioning properly and when air ceases to flow the burner ceases to function and if oil should be allowed to trickle through the burner, enough will accumulate in the combustion chamber to form a pool which vaporizes and ignites with explosive violence and is liable to cause severe damage and fire loss. It is, therefore, essential that the oil flow be shut off even though the oil has just sufficient pressure to trickle through the pipes and through the burner and this is provided for in this apparatus through the function of the weight 28. Once the apparatus is functioning properly, the valve 34 should be opened. It is important that this be done because otherwise air through the pipe 2 might be shut off momentarily, the flame at the burner go out, and thereafter the pressure might be restored, and then oil would be permitted to flow to a burner not operating.

What I have shown and described one embodiment of my invention, it is obvious that it is not restricted thereto, but that it is broad enough to cover all structures that come within the scope of the annexed claims.

Having thus described my invention, what I claim is:

1. In a valve of the class described, an air chamber, an inflow oil chamber, an outflow oil chamber, a valve stem, a valve head on the stem connecting the two oil chambers so as to shut off or open communication between them, a diaphragm between the inflow oil chamber and the air chamber, means for admitting air pressure to the air chamber, and larger means for venting the air chamber, a second valve head connected to said valve stem for closing the connection between the air supply of the air chamber and the venting means when the valve head between the oil chambers is open, and opening the connection between the air admission and the venting means when the valve head between the oil chambers is closed.

2. In a valve of the class described, an air chamber divided into two parts which are connected through a valve head, oil passages in two parts connected by a second valve head, means for connecting the two valve heads together so that one opens, the other closes and vice versa, means for shifting said valve heads according to the pressure in the air chamber, an air pressure pipe connected to one part of the air chamber and a larger air vent connected to the other part of the air chamber.

3. In a valve of the class described, an air chamber, divided into two parts which are connected through a valve head, oil passages in two parts connected by a second valve head, means for connecting the two valve heads together so that when one opens, the other closes and vice versa, means for shifting said valve heads according to the pressure in the air chamber, an air pressure pipe connected to one part of the air chamber and a larger air vent connected to the other part of the air chamber, and manual means for opening and closing the air vent.

4. In a valve of the class described, an air chamber divided into two parts, an inflow oil chamber, an outflow oil chamber, a valve head connecting the two oil chambers so as to shut off or open communication between them, a diaphragm separating the inflow oil chamber and a part of the air chamber, a valve head connected to said diaphragm for controlling communication between the two parts of said air chamber, connections between the said diaphragm and the valve head between the inflow and outflow oil chambers, means for venting the air chamber, a source of air supply to the air chamber with a smaller inlet than the venting means so that the inflow will always be less than the possible outflow, and manually controlled means for closing the venting means.

In testimony whereof, I have hereunto set my hand this 25th day of April, 1928.

OWEN WESLEY BREAR.